July 11, 1933.　　　C. R. ERMISCH　　　1,918,206

CAMERA FOCUSING MECHANISM

Filed Jan. 23, 1932　　　2 Sheets-Sheet 1

INVENTOR
BY　Carl R. Ermisch
　　　　ATTORNEY

July 11, 1933.  C. R. ERMISCH  1,918,206
CAMERA FOCUSING MECHANISM
Filed Jan. 23, 1932  2 Sheets-Sheet 2

INVENTOR
Carl R. Ermisch.
BY
ATTORNEY

Patented July 11, 1933

1,918,206

UNITED STATES PATENT OFFICE

CARL R. ERMISCH, OF ST. PAUL, MINNESOTA, ASSIGNOR OF ONE-HALF TO MELVIN J. MAAS, OF ST. PAUL, MINNESOTA

CAMERA FOCUSING MECHANISM

Application filed January 23, 1932. Serial No. 588,334.

The present invention relates to a focusing mechanism for cameras.

Most cameras, except those of the roll film type, have a ground glass attachment which can be fitted into the back in place of the film or plate so as to properly focus the image on the plate before exposure. Other cameras have a mirror interposed at an angle between the lens and the film or plate to reflect the image onto a ground glass on the top of the camera. In all of these the object to be photographed must be well illuminated in order to cause the image on the ground glass to be clear enough to determine when it is properly focused.

An object of the present invention is to make an improved and simplified focusing mechanism.

In order to attain this object, there is provided, in accordance with one feature of the invention, a supplementary lens of the same focal length as that of a camera lens with which the device is intended to cooperate. The supplementary lens is adapted to be connected to the camera lens carriage, to lie in the same plane as the camera lens. An electric lamp is mounted with its filament spaced from the supplementary lens the same light distance that the sensitized surface of the film or plate to be exposed in the camera, is spaced from the camera lens. Means are provided to substitute for the light filament, a ground glass screen at the same light distance from the supplementary lens as said lamp filament, to be used when the object is brightly illuminated.

These and other features of the invention will be more fully brought out in the following description and the accompanying drawings, wherein.

Figures 1, 2:
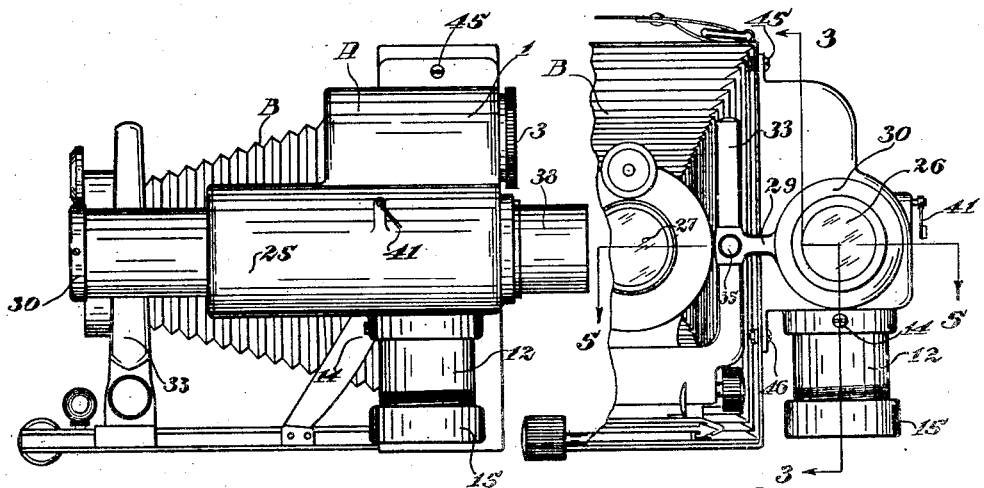
Figure 1 is a view in side elevation of a camera with a focusing attachment embodying the present invention mounted thereon.
Figure 2 is a front view of the camera and focusing device shown in Figure 1, a portion of the camera being broken away.
Figure 3:
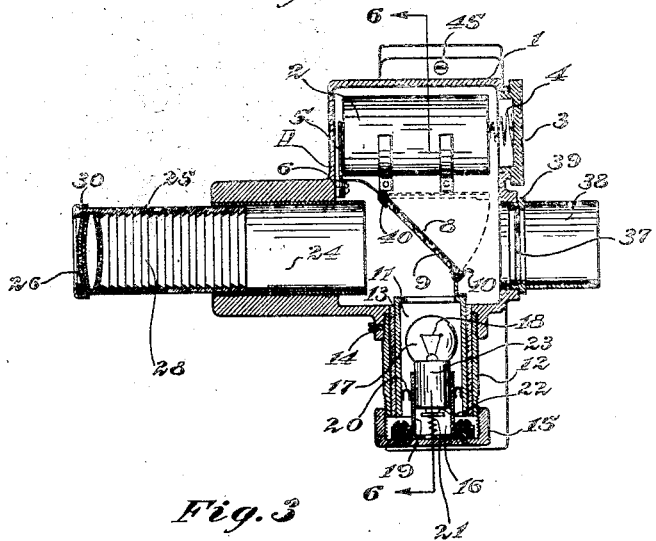
Figure 3 is a sectional view on the line 3—3 of Figure 2.
Figure 4:
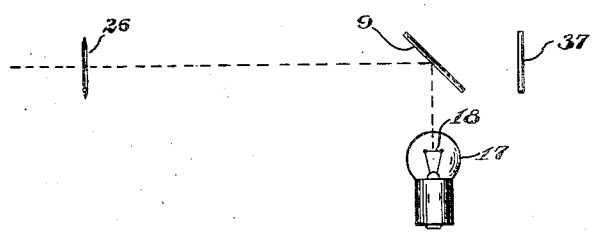
Figure 4 is a schematic view showing the material parts of the invention, a ray of light being indicated in dotted lines.

Referring to the drawings in detail, a housing A is preferably of cast or stamped metal. The upper portion thereof is formed as a compartment 1 to receive a small electric battery 2 and a cover 3 is adapted to fit into an opening through which the battery 2 is inserted into the compartment. A coil spring 4 is secured to the cover 3 and engages the usual metal casing of the battery 2 to ground it to the housing A. A spring contact member 5 is mounted on an insulated block 6 and is adapted to engage the center contact post of the battery 2. The contact member 5 is insulated from the housing by the block 6 and is connected by a conductor 7 to a metal frame 8 which holds a reflecting mirror 9. When the mirror is in the solid line position shown in Figure 3, the metal mirror frame is in contact with a spring clip 10 which is fixedly mounted on the upper edge of a metal tube 11. The metal tube 11 is separated from an outer metal tube 12 by a layer of insulative material 13 which also acts as a binder to bind the inner and outer tubes together as a unit. The outer tube 12 is exteriorly threaded at both ends, its upper end being adapted to screw into an interiorly threaded opening in the lower portion of the housing A. A set screw 14 is provided to hold the tube 12 in adjusted position with the clip 10 in position to receive the lower edge of the mirror when swung to the solid line position of Figure 3.

An internally threaded cap 15 screws onto the lower end of the tube 12 and carries centrally thereof an electric lamp socket 16 in which is mounted a small electric lamp 17, which is here shown as having an S-shaped filament 18 disposed in a plane perpendicular to its longitudinal axis. The sleeve 19 of the socket is insulated from the cap 15 and is provided with spring clips 20 (see Figure 3) which frictionally engage the inner wall of the inner tube 11 to make electrical contact therewith and to hold the cap 15 in adjusted position. A coil spring 21 is mounted centrally of the sleeve 19 and is in electrical contact with the cap 15 to engage the center terminal 22 of the lamp 17. The lamp filament 18 is electrically connected on one end to the center terminal 22 of the lamp base, and on the other end to the metal casing 23 of the lamp base. Thus, when the mirror is in solid line position shown in Figure 3, a circuit is completed from the battery casing through the spring 4, the housing A, the outer tube 12, the cap 15, and the spring 21 to the base terminal 22 of the lamp. Thence the circuit is through the filament 18, the lamp base casing 23, the spring clips 20, the inner tube 11, the clip 10, the mirror frame 8, the conductor 7, and the contact member 5 to the center post of the battery 2.

A brass sleeve 24 is affixed in a tubular forward extension 25 of the housing A and within this sleeve 24 is telescopically mounted a tubular member 25 having a lens 26 mounted in the forward end thereof. The lens 26 is of the same focal length as a lens 27 of a camera B with which the device is to be used. The telescoping tube 25 is preferably provided with inner annular serrations 28 and the interior thereof is preferably blackened to prevent reflection of undesirable light rays.

Figure 5:
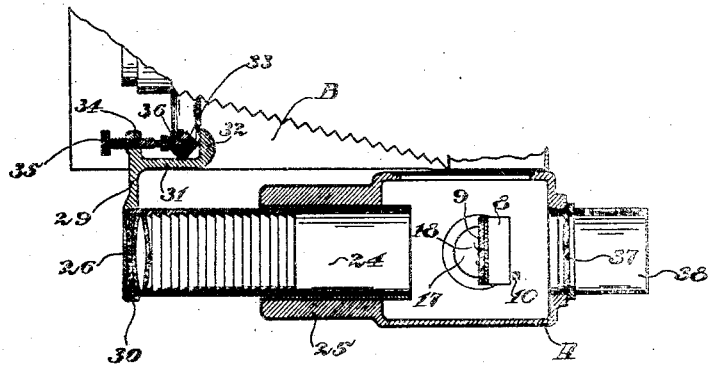
Figure 5 is a sectional view on the line 5—5 of Figure 2.
Figure 6:
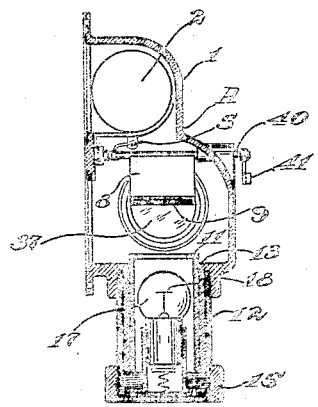
Figure 6 is a sectional view on the line 6—6 of Figure 3.

An arm 29 is formed integrally with a lens retaining ring 30 and is provided with a rearwardly extending portion 31 (see Figure 5), having a laterally offset rear portion 32 adapted to engage a camera lens support post 33. An offset portion 34 with a threaded opening therein is also formed on the forward portion of the arm 29 and a thumb screw 35 is threadedly inserted in this opening. A V-shaped clamp member 36 is pivotally supported on the inner or rear end of the thumb screw 35 to engage the post 33 and secure the member 29 in position, with the supplementary lens 26 in the same plane as the camera lens 27. The tube 25 and supplementary lens 26 are carried forward and back by the camera lens carriage of which the post 33 forms a part, so that the lenses 25 and 26 remain at all times in the same plane. If it is desired to fold the camera with the present device attached, the thumb screw 35 may be loosened to remove the V-shaped clamp 36 from engagement with the post 33. The tube 25 may then be rotated to swing the arm 29 away from the post 33 and the camera may then be folded in the customary manner.

The housing A may be secured to the camera as by means of bolts 45 and 46.

The type of camera shown is so well known to the art that a detailed description thereof is believed to be unnecessary.

A ground focusing glass 37 is mounted in a tubular holder 38 which has a close press fit in an opening in the rear end of the housing A, in axial alinement with the supplementary lens 26 of the focusing device. A flange 39 limits the depth of insertion of the tubular holder 38. The outer end of the holder 38 beyond the flange 39 is preferably of the same diameter as the inner end so that the holder may be inserted in reversed position when the mirror 9 is swung up to the dotted line position shown in Figure 3. When thus reversed the length of the exterior extending portion of the ground glass holder is reduced.

The mirror 9 is fixedly secured to a shaft 40 which is pivotally mounted in insulative bushings, not shown, in the housing A. An operating lever 41 is fixedly secured to the outer end of the shaft 40 to permit manipulation of the mirror.

Figures 7, 8:
Figure 7 is an outline of an image of an electric lamp filament when properly focused on an object.
Figure 8 is a view similar to Figure 7 with the filament image out of focus.

The operation of the device is as follows:

Assuming that a new lamp 17 has just been inserted, it is first necessary to adjust the focus of the light filament. This may be done conveniently by setting the camera upon a tripod, not shown, and swinging the mirror 9 up to the dotted line position shown in Figure 3 and focusing the camera either by means of the ground glass 37, or, if desired, the focusing can be done on a ground glass focusing plate, not shown, of the camera itself. This focusing should preferably be of a clearly defined, well illuminated flat object, such as a wall, and should be done in a room which can be subsequently darkened. Without disturbing the camera or the object upon which the focus has been thus obtained, the room should then be darkened and the mirror 9 swung down to the solid line position shown in Figure 3. This illuminates the lamp 17 and the image of the filament 18 is reflected by the mirror forwardly through the lens 26. If the lens is in proper focus, the image of the filament will appear on the object upon which the focus was obtained as a clear, sharp, enlarged, illuminated image 50 of the filament itself, as shown in Figure 7. If not in proper focus, the image will appear fuzzy, as shown at 51 in Figure 8. Adjustment of the focus is obtained by screwing the cap 15 up or down, as required, to bring the image of the filament into clear, sharp focus on the object. Once this adjustment is made, it will be unnecessary to repeat it for the life of the lamp, and, if the lamps are made by precision machinery so that the filaments are all at the same height with respect to the base, it will be unnecessary to re-focus the device on replacing a lamp, provided the cap 15 is advanced the same number of threads on replacing it after removal.

Assuming that the above initial focusing adjustment has been made, and that a picture is to be made of a well illuminated object, the outline of the picture may be determined by an ordinary view finder, not shown, of a type well known to the art. The proper focus may then be obtained by focusing a portion of the object to be photographed on the ground glass 37, it being apparent that the glass 37 is too small to receive the entire image to be photographed. As soon as proper focus is obtained, the camera shutter may be actuated to make the required exposure. Assuming that a picture is to be made of a darkened or poorly illuminated object; and this is the principal feature of the present invention, the mirror 9 is swung down to the solid line position shown in Figure 3. This illuminates the lamp 17 and projects the image of the filament forward through the lens 26 as previously described. This image is directed to fall on the object to be photographed and is focused sharply on said object. This indicates that the camera is focused on said object and exposure may then be made by means of a flashlight or time exposure, as required.

The device is simple and easy to operate and permits easy and accurate focusing under any and all conditions where photography is possible, without removing the film or plate holder from the camera.

Various modifications of the structure may be necessary to adapt the invention for use with different types of cameras, but these can be readily worked out by a mechanic skilled in the art, and it is, therefore, felt unnecessary to burden the present specification by including such modified forms.

I claim:

1. In combination with a camera having an adjustable focusing lens, a focusing device having an illuminating means, a supplementary focusing lens mounted in the path of light rays from said illuminating means, and means adapted to connect said focusing device to a camera to move said supplemental focusing lens in conjunction with said camera lens to focus said light rays upon an object to be photographed at a predetermined distance from said illuminating means, and to co-ordinately focus said camera lens on said object.

2. A camera focusing attachment for a camera having an adjustably mounted lens and a sensitized photographic surface therein comprising illuminating means adapted to be mounted on said camera, a lens holder adapted to receive a lens of a focal length equal to that of a camera with which the attachment is to be used, and movable with respect to said illuminating means, and adjusting means mounted to co-ordinately focus the camera lens, and to focus the image of said illuminating means on an object to be photographed.

3. In combination with a camera having an adjustable focusing lens, an illuminated member, and focusing means mounted in the path of light rays from said illuminated member to focus an image of said illuminated member on an object to be photographed co-ordinately with the focusing of said camera lens.

4. In combination with a camera having an adjustable focusing lens, a supplementary lens of the same focal length as said camera lens mounted in the same plane as said camera lens and connected thereto to be adjustable therewith, and illuminating means positioned to project an image thereof through said supplementary lens to be focused thereby on an object to be photographed co-ordinately with the focusing of said camera lens on said object.

5. In combination with a camera having an adjustable focusing lens, a supplementary lens mounted in the same plane as said camera lens and adjustable therewith, a ground glass focusing screen mounted in alinement with said supplementary lens, a reflecting mirror removably positioned in the path of light rays between said supplementary lens and said focusing screen and at an acute angle thereto, an illuminating member mounted to project light rays onto said reflecting mirror and outwardly through said supplementary lens, said illuminating means being the same light distance from said supplementary lens when so reflected as that which separates said supplementary lens from said reflecting screen to focus an image of said illuminating member on an object to be photographed co-ordinately with the focusing of said camera lens on said object.

In testimony whereof I affix my signature.

CARL R. ERMISCH.